UNITED STATES PATENT OFFICE.

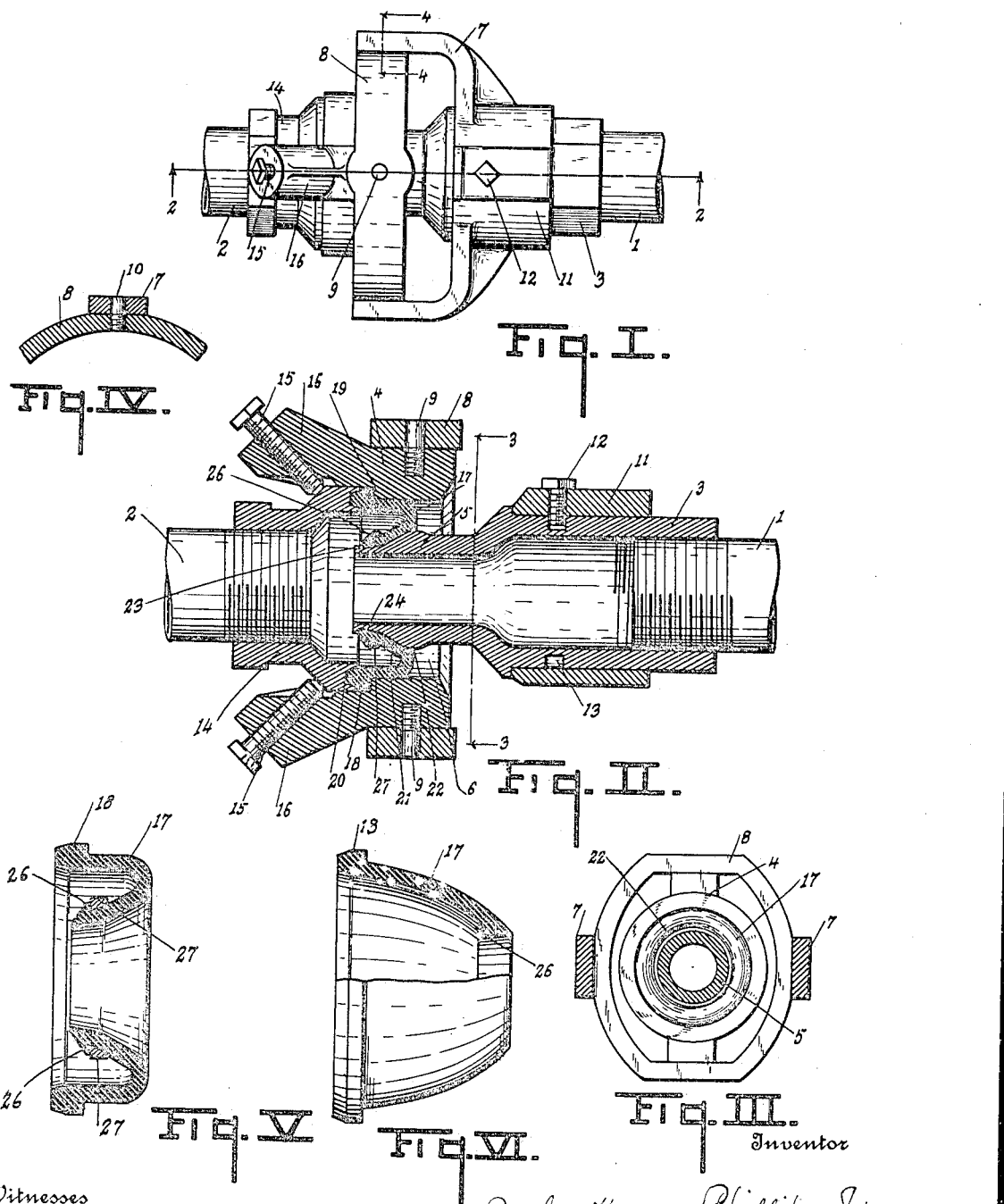

JOHN HENRY PHILLIPS, JR., OF JACKSON, MICHIGAN, ASSIGNOR TO PHILLIPS METALLIC HOSE CO., OF JACKSON, MICHIGAN.

FLEXIBLE PIPE-JOINT.

1,117,962.  Specification of Letters Patent.  Patented Nov. 17, 1914.

Continuation of application Serial No. 587,661, filed October 18, 1910. This application filed January 19, 1914. Serial No. 812,978.

*To all whom it may concern:*

Be it known that I, JOHN H. PHILLIPS, Jr., a citizen of the United States, residing at the city of Jackson, Michigan, have invented certain new and useful Improvements in Flexible Pipe-Joints, of which the following is a specification.

This invention relates to improvements in flexible pipe joints.

This application is a continuation of my application for Letters Patent filed Oct. 18, 1910, Serial No. 587,661.

The main objects of this invention are: First, to provide an improved flexible pipe joint having very free movement and at the same time, one not likely to leak, and capable of withstanding very heavy pressures. Second, to provide an improved pipe joint in which the wear on the parts is minimized and is not likely to produce leaks. Third, to provide an improved flexible pipe joint in which the parts are very economical in structure and easily assembled.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing forming a part of this specification, in which:

Figure I is a side elevation of a structure embodying the features of my invention, the pipes to which the parts are attached being broken away. Fig. II is a detail longitudinal section on a line corresponding to line 2—2 of Fig. I, the pipes and certain other parts being shown in full lines. Fig. III is a transverse section on a line corresponding to line 3—3 of Fig. II. Fig. IV is a detail section on a line corresponding to line 4—4 of Fig. I, showing details of the coupling. Fig. V is a transverse section through the flexible joint member 17. Fig. VI is a detail view partially in longitudinal section, of the flexible joint member as it comes from the mold.

In the drawing similar reference characters refer to similar parts throughout the several views, and the sectional views are taken looking in the direction of the little arrows at the ends of the section lines.

Referring to the drawings, 1 and 2 represent the pipes to be coupled. The male coupling member is connected to the pipe 1 and the female coupling member 4 is connected to the pipe 2. The male coupling member 3 has a nipple 5 projecting into the socket 6 of the female member, the socket being cylindrical and of a substantially greater diameter than the male coupling member so that the male coupling member may swing freely therein without contacting with the walls thereof, the members being supported in their coacting relation by a universal joint connection.

In the structure illustrated, this universal joint connection consists of a forked member 7 and a ring member 8. The ring member 8 is mounted on the female member 4 by means of the radially disposed pivots 9, while the male member is connected to the ring member by the pivots 10 disposed with their axes in a plane at right angles to the planes of the pivots 9. The male member is swiveled in the forked member which has a swivel portion 11. See Fig. II. The parts are retained together by the set screw 12 engaging the annular groove 13 in the male member.

The pipe 2 is connected by means of the coupling 14 which seats into the female member and is retained by the screws 15, the female member being provided with arms 16 for supporting these screws in proper position.

The annular flexible joint member 17 is preferably formed of rubber and is substantially U-shaped in cross section, its inner end being turned inwardly within the outer portion. The outer portion of the flexible joint member is substantially cylindrical, while the inner portion is tapered. The outer portion of the flexible joint member 17 fits within the socket of the female member 4 and is supported by the walls thereof. The joint member 17 is provided with an annular rib-like flange 18 at its outer end which engages an annular shoulder 19 provided in the female member.

The coupling member 14 has an annular packing seat 20 in its end to receive the end of the joint member 17 so that when the coupling member 14 is secured in place, the packing member is also secured and also constitutes an effective packing between the female member and the coupling member 14.

The male member is tapered at 21 and provided with a curved annular shoulder 22 at the rear end of the tapered portion. The nipple has an annular flange 23 at its end and a tapered neck portion 24 between the flange and the tapered portion 22, the nipple in the structure illustrated being continuously tapered, but at different degrees.

The inner portion of the joint member 17 is arranged upon the nipple with its inner end inside of the flange 23. The joint member has an annular flange 26 at its inner end and a supporting ring 27 is arranged within this flange embracing the nipple outside of the neck portion thereof. This ring is preferably beveled internally, as shown, so that the joint member 17 is not cut thereby but is held upon the nipple so that it cannot slip off by the flexing of the joint and cannot be forced off or over the shoulder of the nipple by heavy pressures.

The curve of the joint member is in substantially the plane of the crown of the shoulder 22 so that the joint member rolls over and is supported by the shoulder as the members are swung relative to each other.

I thus provide a very secure joint and one which is capable of withstanding very heavy pressures. The joint members 17 are, in practice, molded in the form shown in Fig. VI, the small ends being turned inwardly when they are applied. The joint member 17 is easily removed or replaced should occasion require, but is very durable and capable of withstanding heavy pressures. The wear upon the joint members is minimized and they flex freely and without cramping or binding action thereon. Further, the joint members are not exposed to frictional wear in the manner of an ordinary packing ring in a ball and socket joint, and I secure the advantages of a universal joint without accurate fitting of parts and the wear resulting from friction of parts.

My improved joint is especially designed by me for train pipe joints and I have shown the same embodied in a structure for that purpose. It is, however, readily adapted for use in a great many relations.

Having thus described my invention, what I claim as new and desire to secure by Letters Patent is:

1. In a pipe coupling, the combination of a male and female member, the male member being provided with a forwardly projecting tapered nipple having an annular flange at its end, the opening in the female member being cylindrical, its diameter being substantially greater than the diameter of the nipple; a universal joint connection for said members whereby the nipple is supported to swing freely within said female member and out of contact with the walls thereof; a universal joint member of flexible material having an outer portion fitting the opening of said female member and supported thereby, and an inturned tapered portion fitting upon the nipple of said male member to swing therewith and provided with an external annular flange, the end of the inturned portion being within the flange of said nipple, the bend of the joint member being substantially at the crown of said nipple shoulder whereby it is supported by the shoulder as the joint members are swung relative to each other; and a supporting ring embracing the inner portion of said joint member on the inner side of its flange, all coacting for the purpose specified.

2. In a pipe coupling, the combination of a male and female member, the male member being provided with a forwardly projecting tapered nipple having an annular flange at its end, the opening in the female member being cylindrical, its diameter being substantially greater than the diameter of the nipple; a universal joint connection for said members whereby the nipple is supported to swing freely within said female member and out of contact with the walls thereof; a universal joint member of flexible material having an outer portion fitting the opening of said female member and supported thereby, and an inturned tapered portion fitting upon the nipple of said male member to swing therewith and provided with an external annular flange, the end of the inturned portion being within the flange of said nipple; and a supporting ring embracing the inner portion of said joint member on the inner side of its flange, all coacting for the purpose specified.

3. In a pipe coupling, the combination of a male and female member, the male member being provided with a forwardly projecting tapered nipple having an annular flange at its end; a connection for said members whereby the nipple of said male member is supported to swing freely within said female member and out of contact with the walls thereof; an annular flexible joint member having an outer portion fitting the opening of said female member and supported thereby, and an inturned tapered portion fitting upon the nipple of said male member to swing therewith and provided with an external annular flange, the end of the inturned portion being within the flange of said nipple; and a supporting ring embracing the inner portion of said joint member on the inner side of its flange, all coacting for the purpose specified.

4. In a pipe coupling, the combination of a male and female member, the male member being provided with a forwardly projecting tapered nipple having an annular flange at its end; a connection for said members whereby the nipple of said male member is supported to swing freely within said female member and out of contact with the walls thereof; and an annular flexible joint member having an outer portion fitting the opening of said female member and supported thereby, and an inturned tapered portion fitting upon the nipple of said male member to swing therewith, the end of the inturned portion being within the flange of said nipple, all coacting for the purpose specified.

5. In a pipe coupling, the combination of a male and female member, the male member being provided with a forwardly projecting tapered nipple having a curved annular shoulder at the rear end of the tapered portion; a connection for said members whereby the nipple of said male member is supported to swing freely within said female member and out of contact with the walls thereof; and an annular flexible joint member having an outer portion fitting the opening of said female member and supported thereby, and an inturned tapered portion fitting upon the nipple of said male member to swing therewith, the bend of the joint member being substantially at the crown of said nipple shoulder whereby it is supported by the shoulder as the joint members are swung relative to each other, all coacting for the purpose specified.

6. In a pipe coupling, the combination of a male and a female member, the male member being provided with a forwardly-tapered nipple; a universal joint connection for said members comprising a forked member in which said male member is swiveled, and a ring member pivoted on said female member, said joint members being connected by pivots arranged at right angles to the pivots for said ring member on said female member; a pipe member having a groove-like packing ring seat in its forward edge, said female member being provided with a socket for said pipe member, and an annular joint member of flexible material U-shaped in cross section, the edge of the outer arm of said joint member being seated in said seat in the end of said pipe member and being shouldered to engage the inner end of said pipe member seat, the inner arm of said joint member being sleeved upon said nipple, said inner arm being provided with a supporting ring.

7. In a pipe coupling, the combination of a male and a female member; a universal joint connection for said members, comprising a forked member in which said male member is swiveled, and a ring member pivoted on said female member, said joint members being connected by pivots arranged at right angles to the pivots for said ring member on said female member; a pipe member having a groove-like packing ring seat in its forward edge, said female member being provided with a socket for said pipe member; and an annular joint member of flexible material U-shaped in cross section, the edge of the outer arm of said joint member being seated in said seat in the end of said pipe member and being shouldered to engage the inner end of said pipe member seat, the inner arm of said joint member being sleeved upon said male member.

8. In a pipe coupling, the combination of a male and a female member, the male member being provided with a forwardly-tapered nipple; a universal joint connection for said members; a pipe member having a groove-like packing ring seat in its forward edge, said female member being provided with a socket for said pipe member; and an annular joint member of flexible material U-shaped in cross section, the edge of the outer arm of said joint member being seated in said seat in the end of said pipe member and being shouldered to engage the inner end of said pipe member seat, the inner arm of said joint member being sleeved upon said nipple, said inner arm being provided with a supporting ring.

9. In a pipe coupling, the combination of a male and a female member; a universal joint connection for said members; a pipe member having a groove-like packing ring seat in its forward edge, said female member being provided with a socket for said pipe member; and an annular joint member of flexible material U-shaped in cross section, the edge of the outer arm of said joint member being seated in said seat in the end of said pipe member and being shouldered to engage the inner end of said pipe member seat, the inner arm of said joint being sleeved upon said male member.

10. In a pipe coupling, the combination of a male and a female member, the male member being provided with a forwardly-tapered nipple; means for supporting said members in their coacting relation; a pipe member having a groove-like packing ring seat in its forward edge, said female member being provided with a socket for said pipe member and with rearwardly-projecting arms; clamping screws for said pipe member carried by said arms; and an annular joint member of flexible material U-shaped in cross section, the edge of the outer arm of said joint member being seated in said seat in the end of said pipe member, and being shouldered to engage the inner end of said pipe member seat, the inner arm of said joint member being sleeved upon said nipple, said inner arm being provided with a supporting ring.

11. In a pipe coupling, the combination of a male and a female member, the male member being provided with a forwardly-tapered nipple; means for supporting said members in their coacting relation; a pipe member having a groove-like packing ring seat in its forward edge, said female member being provided with a socket for said pipe member; means for securing said pipe member in its socket; and an annular joint member of flexible material U-shaped in cross section, the edge of the outer arm of said joint member being seated in said seat in the end of said pipe member and being shouldered to engage the inner end of said pipe member seat, the inner arm of said joint member being sleeved upon said nipple, said inner arm being provided with a supporting ring.

12. In a pipe coupling, the combination of a male and a female member; means for supporting said members in their coacting relation; a pipe member having a groove-like packing ring seat in its forward edge, said female member being provided with a socket for said pipe member and with rearwardly-projecting arms; clamping screws for said pipe member carried by said arms; and an annular joint member of flexible material U-shaped in cross section, the edge of the outer arm of said joint member being seated in said seat in the end of said pipe member and being shouldered to engage the inner end of said pipe member seat, the inner arm of said joint member being sleeved upon said male member.

13. In a pipe coupling, the combination of a male and female member; means for supporting said members in their coacting relation; a pipe member having a groove-like packing ring seat in its forward edge, said female member being provided with a socket for said pipe member, means for securing said pipe member in its socket; and an annular joint member of flexible material U-shaped in cross section, the edge of the outer arm of said joint member being seated in said seat in the end of said pipe member and being shouldered to engage the inner end of said pipe member seat, the inner arm of said joint member being sleeved upon said male member.

14. In a pipe coupling, the combination of a male and a female member, the male member being provided with a forwardly-tapered nipple; a universal joint connection for said members comprising a forked member in which said male member is swiveled, and a ring member pivoted on said female member, said joint members being connected by pivots arranged at right angles to the pivots for said ring member on said female member; and an annular joint member of flexible material U-shaped in cross section, the outer arm of said joint member being secured to said female member, the inner arm being sleeved upon said nipple, said inner arm being provided with a supporting ring.

15. In a pipe coupling, the combination of a male and a female member; a universal joint connection for said members comprising a forked member in which said male member is swiveled, and a ring member pivoted on said female member, said joint members being connected by pivots arranged at right angles to the pivots for said ring member on said female member; and an annular member of said flexible material U-joint member of said flexible material U-shaped in cross section, mounted within said female member with its outer arm secured thereto, its inner arm being connected to said male member.

16. In a pipe coupling, the combination of a male and a female member, the male member being provided with a forwardly-tapered nipple; a universal joint connection for said members whereby said male member nipple is supported to permit its free swinging movement within said female member; and an annular joint member of flexible material U-shaped in cross section, mounted within said female member with its outer arm secured thereto, its inner arm being sleeved upon said nipple, said inner arm being provided with a supporting ring arranged on the forward or small end of said nipple.

17. In a pipe coupling, the combination of a male and a female member, the male member being provided with a forwardly-projecting tapered nipple, the opening in the female member being cylindrical, the diameter of the opening being substantially greater than the diameter of the nipple; a universal joint connection for said member whereby the nipple of said male member is supported to swing freely within said female member and out of contact with the walls thereof; and a universal joint member of flexible material having an outer portion fitting the opening of said female member and supported thereby and provided with an annular shoulder at its outer end, said female member being provided with a coacting annular shoulder, and an inturned tapered portion fitted upon the nipple of said male member to swing therewith, said inturned tapered portion being provided with a supporting ring to prevent its expansion.

18. In a pipe coupling, the combination of a male and a female member, the male member being provided with a forwardly-member being provided with a forwardly-projecting tapered nipple, the opening in the female member being substantially greater than the diameter of the nipple; a universal joint connection for said members whereby the nipple of said male member is supported to swing freely within said female member and out of contact with the walls thereof; and an annular joint member of flexible material having an outer portion fitting the opening of said female member and supported thereby, and an inturned tapered portion fitted upon the nipple of said male member to swing therewith.

19. In a pipe coupling, the combination of a male and a female member; means of supporting said members in their coacting relation with the forward end of the male member within said female member and out of contact with the walls thereof to swing freely therein, the opening of the female member being cylindrical; and an annular joint member of flexible material U-shaped in cross section and fitted within and supported by the walls of said female member, the inner arm being tapered inwardly and sleeved upon the inner end of said male member to swing therewith, there being an annular space between the inner and outer arms of said joint member when the parts are in their central position.

20. In a pipe coupling, the combination of a male and a female member; a connection for said members whereby the inner end of said male member is supported within said female member to swing freely therein and out of contact with the walls thereof; and a flexible annular joint member arranged within said female member, said joint member being turned inwardly upon itself, its outer portion being fitted within the opening of said female member and supported by the walls thereof, its inner end being sleeved upon and connected to the inner end of said male member, there being an annular space between the inner and outer portions of said joint member when the parts are in their central position.

21. A pipe coupling comprising a male and female member, the male member being provided with a forwardly-tapered nipple, said members being connected and supported so that said nipple swings freely within said female member; and a coacting flexible annular joint member arranged within said female member, said joint member being turned inwardly upon itself, its inturned end being sleeved upon the tapered end of said nipple and embraced by a supporting ring whereby its expansion is prevented.

22. In a pipe coupling, the combination of a male and female member, the male member being provided with a forwardly projecting nipple; a universal joint connection for said members whereby said nipple is supported to swing within said female member; an annular joint member of flexible material U-shaped in cross section arranged within said female member, the inner arm of said joint member being sleeved upon said nipple, said annular member being provided with an annular shoulder; and a pipe coupling arranged in said female member to clamp the outer arm of said joint member against said shoulder.

23. In a pipe coupling, the combination of a male and female member, the male member being provided with a forwardly-projecting nipple; a connection for said members whereby said male member nipple is supported to swing freely within said female member; a flexible annular joint member arranged within said female member, said joint member being turned inwardly upon itself, its inner arm being connected to said male member nipple to swing therewith; and a pipe coupling member arranged in said female member to secure the outer arm of said joint member.

24. In a pipe coupling, the combination of a male and a female member, connections for said members whereby the male member is supported to swing within said female member, and an annular flexible joint member U-shaped in cross section interposed between said male and female members with its outer arm mounted within said female member and its inner arm sleeved upon said male member to swing therewith, said male member being provided with an annular curved part upon which the said joint member rocks as it is flexed by the swinging of the male and female members.

25. In a pipe coupling, the combination of a male and a female member connected for swinging movement of the male member within the female member and an annular joint member of flexible material U-shaped in cross section, the outer arm of said joint member being mounted within said female member, its inner arm being sleeved upon and secured to said male members to swing therewith.

26. In a pipe coupling, the combination of a male and a female member, the male member being provided with a curved annular sholder, a connection for said members whereby the male member is supported to swing within said female member, and an annular flexible joint member mounted within said female member and having an inturned portion secured to said male member to swing therewith, the bend of the joint member being substantially at the crown of said shoulder whereby it is supported at the point of flexing by said shoulder.

27. In a pipe coupling, the combination of a male and a female member, a connection for said members whereby the inner end of said male member is supported to swing within said female member, and a flexible annular joint member mounted within said female member, said joint member being turned inwardly upon itself, its inturned end being secured to said male member to swing therewith and being supported thereby at the point of flexing.

28. In a pipe coupling, the combination of a male and a female member connected for swinging movement, the one within the other and an annular flexible joint member mounted within said female member and having an inturned portion secured to the male member to swing therewith.

29. In a pipe coupling, the combination of a male and a female member provided with a universal joint connection, and an annular flexible joint member mounted within said female member and having an inturned portion mounted on said male member to swing therewith.

In witness whereof, I have hereunto set my hand and seal in the presence of two witnesses.

JOHN HENRY PHILLIPS, JR. [L. S.]

Witnesses:
E. J. PHILLIPS,
E. B. WOOD.